(No Model.)

A. McDONALD.
SACK HOLDER.

No. 426,208. Patented Apr. 22, 1890.

Witnesses:
Geo. H. Strong
J. H. Nurse

Inventor
Alexander McDonald
By Dewey & Co.
Attys

UNITED STATES PATENT OFFICE.

ALEXANDER McDONALD, OF FRANKLIN, CALIFORNIA.

SACK-HOLDER.

SPECIFICATION forming part of Letters Patent No. 426,208, dated April 22, 1890.

Application filed February 3, 1890. Serial No. 339,071. (No model.)

*To all whom it may concern:*

Be it known that I, ALEXANDER MCDONALD, a citizen of the United States, residing at Franklin, Sacramento county, State of California, have invented an Improvement in Sack-Holders; and I hereby declare the following to be a full, clear, and exact description of the same.

My invention relates to that class of implements which are designed to hold a sack, with its mouth or opening properly spread, under a discharge chute or spout, whereby grain and other material are delivered to it.

My invention consists in a frame having arms by which it is secured to the chute or spout, said frame having in one side fixed teeth or tines for engaging one side of the sack and in its other side a rock-shaft provided with teeth for engaging the other side of the sack, said shaft having a lever by which it is rocked, whereby the teeth are caused to stretch and hold the sack, and in a means connected with said rock-shaft for operating automatically the cut-off gate or valve of the chute or spout, all of which I shall hereinafter fully describe.

The object of my invention is to provide a simple and effective sack-holder, to which the sack may be readily applied and perfectly held and as easily released.

Figure 1:
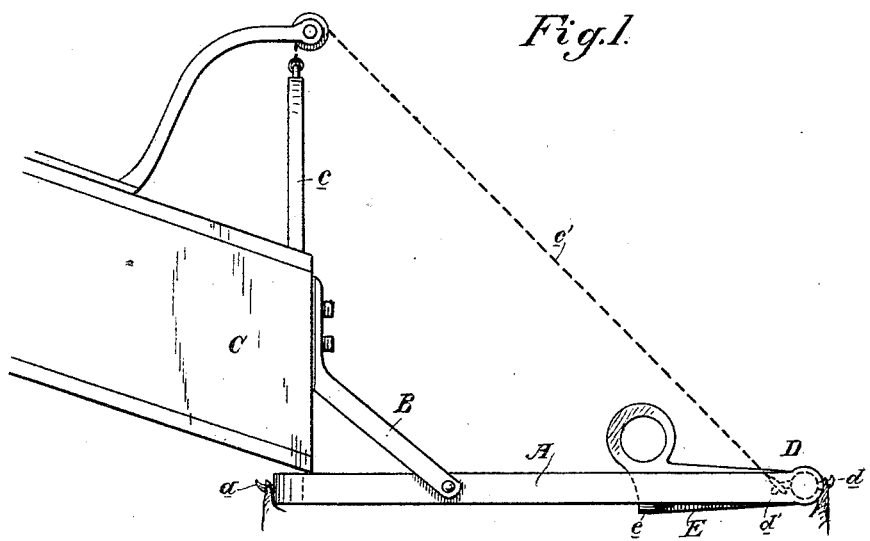
Figure 2:
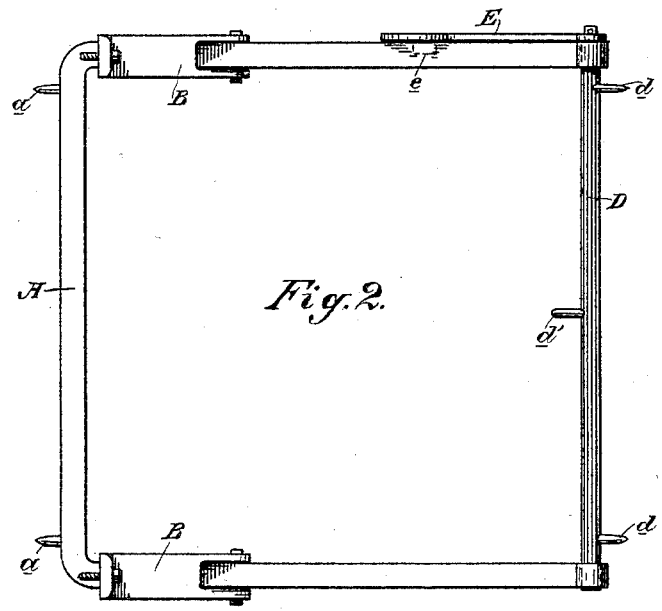

Referring to the accompanying drawings for a more complete explanation of my invention, Figure 1 is a side elevation of my sack-holder, showing it in position. Fig. 2 is a plan of same.

A is the frame of my sack-holder, here shown as a four-sided one, having on each side arms B, by which the frame may be readily bolted or otherwise secured to the discharge chute or spout C, from which the grain or other material is delivered. In the back of the frame, and extending rearwardly from its back bar, are the teeth $a$. Across the front of the frame is a rock-shaft D, having teeth $d$ projecting from it. On the end of the shaft is a lever E, having near its handle end a catch-lug $e$, adapted to pass under and engage with the side bar of the frame, said lever being made springy, so that the lug may readily pass to its position and be released therefrom. The rock-shaft also carries a central hook $d'$, which extends in a direction opposite to the teeth $d$.

The chute C is provided with an end-gate $c$, which is suspended by means of a cord $c'$, the other end of which is lightly hooked over the hook $d'$.

The teeth $a$ and $d$ may be slightly curved, as shown.

The operation of the device is as follows: The frame A is secured to the end of the chute or spout by means of the arms B. One side of the sack F is now hooked over the teeth $a$ at the back of the frame and the other side is hooked over the teeth $d$ of the rock-shaft D, said teeth being then in a position extending backwardly. Thereupon the lever E is thrown backwardly, so as to rock the shaft D and carry its teeth $d$ forwardly, thereby causing them to better engage the sack and stretch its mouth open, firmly holding it in this position. The rock-shaft is held by the engagement of the lug $e$ of the lever with the under side of the side bar of the frame. The gate $c$ of the chute is held up by the cord $c'$, the end of which, as before stated, is passed over the hook $d'$. When the sack is full, the operator releases the lever E and lets it fly forwardly, the weight of the sack turning the rock-shaft D, so that its teeth $d$ are turned downwardly and backwardly, and thereby withdrawing themselves or releasing the sack, so that it may be readily removed from the rear teeth $a$. At the same time that this operation takes place the hook $d'$ releases itself by the turning of the shaft D from the cord $c'$ and lets the gate $c$ of the chute drop, so as to cut off any further supply of material.

Having thus described my invention, what I claim as new, and desire to secure by Letters Patent, is—

1. The combination of the spout, the arms B, a frame carried by said arms, a rock-shaft at one side of the frame having teeth, fixed teeth at the opposite side of the frame, and a springing lever having a lug adapted to engage the frame to secure the rock-shaft, substantially as herein described.

2. The combination of the discharge-spout having a controlling-gate, a sack-holding frame supported from the spout, having at opposite sides means for the attachment of a bag, a rock-shaft having a hook $d'$, a connection between this hook and the gate, and a lever for rocking the shaft, substantially as described.

3. A sack-holder consisting of the frame A, the arms B, by which said frame is secured to the discharge spout or chute, the teeth $a$ at the rear of the frame, the rock-shaft D in the front of the frame, having the teeth $d$, and the lever E, by which the rock-shaft is operated and held, substantially as herein described.

4. The discharge chute or spout C, provided with the end-gate $c$, and a string $c'$ attached thereto, whereby it is suspended, in combination with the frame A, secured to said spout or chute, having the teeth $a$ at its rear, the rock-shaft D in the front of the frame, having the teeth $d$, the lever for operating the rock-shaft, and the hook $d'$ on the rock-shaft, with which the string engages, substantially as herein described.

In witness whereof I have hereunto set my hand.

ALEXANDER McDONALD.

Witnesses:
   L. S. TAYLOR,
   S. SOLON HOLL.